US010113224B2

(12) United States Patent
Poupon

(10) Patent No.: US 10,113,224 B2
(45) Date of Patent: Oct. 30, 2018

(54) FRICTION ADJUSTMENT INTERFACE BETWEEN TWO PARTS MADE OF NICKEL OR NICKEL OR COBALT-CHROMIUM ALLOY THAT ARE IN RELATIVE MOTION AGAINST ONE ANOTHER AT HIGH TEMPERATURE

(71) Applicant: Airbus Operations (S.A.S.), Toulouse (FR)

(72) Inventor: Cédric Poupon, Colomiers (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 15/294,092

(22) Filed: Oct. 14, 2016

(65) Prior Publication Data

US 2017/0107603 A1 Apr. 20, 2017

(30) Foreign Application Priority Data

Oct. 16, 2015 (FR) .................... 15 59880

(51) Int. Cl.
  *C03C 27/00* (2006.01)
  *C23C 4/123* (2016.01)
  (Continued)

(52) U.S. Cl.
  CPC .............. *C23C 4/123* (2016.01); *C22C 19/07* (2013.01); *C22F 1/10* (2013.01); *C23C 4/08* (2013.01);
  (Continued)

(58) Field of Classification Search
  None
  See application file for complete search history.

(56) References Cited

U.S. PATENT DOCUMENTS

2013/0337221 A1  12/2013  Brahmandam et al.
2015/0071762 A1   3/2015  Rentz

FOREIGN PATENT DOCUMENTS

FR  2907468 A1  4/2008
KR  20130003300 A  *  1/2013

OTHER PUBLICATIONS

Cho et al., Machine Translation of KR 2013-0003300 Description, Jan. 9, 2013 (Year: 2013).*

(Continued)

*Primary Examiner* — David Sample
*Assistant Examiner* — Mary I Omori
(74) *Attorney, Agent, or Firm* — Jenkins, Wilson, Taylor & Hunt, P.A.

(57) ABSTRACT

An adjustment interface inserted between a first part made of nickel or made of nickel alloy or made of cobalt-chromium alloy in relative motion with a second part made of nickel or made of nickel alloy or made of cobalt-chromium alloy. The interface includes a first adjustment layer on one of the two parts and has a composition that makes it possible, with the friction with the other part, to create a glaze-type layer. A second adjustment layer is deposited on the second part for cooperation with the first layer to act as a catalyst for the oxide formed by friction with the first layer. The first glaze layer of the interface improves the sliding of the parts under friction. The catalyst function provided by the second layer makes it possible to stabilize the oxide formed by friction and to thus ensure a lubrication function over an extended high-temperature range.

17 Claims, 3 Drawing Sheets

(51) Int. Cl.
*C22C 19/07* (2006.01)
*C23C 4/08* (2016.01)
*C23C 4/18* (2006.01)
*C23C 8/12* (2006.01)
*C23C 8/02* (2006.01)
*C23C 8/28* (2006.01)
*C22F 1/10* (2006.01)

(52) U.S. Cl.
CPC .................. *C23C 4/18* (2013.01); *C23C 8/02* (2013.01); *C23C 8/12* (2013.01); *C23C 8/28* (2013.01)

(56) References Cited

OTHER PUBLICATIONS

Poupon et al., Machine Translation of FR 2907468 Description, Apr. 25, 2008 (Year: 2008).*
Tribaloy T-800, rolledalloys.com, Feb. 10, 2013 (Year: 2013).*
Database WPI Week 201318 2013 Thomson Scientific, London, GB; AN 2013-A98791 XP002758277, -& KR 2013 0003300 A (Univ Changwon Nat Ind&Acad Coop) Jan. 9, 2013 (Jan. 9, 2013).
French Search Report for Application No. 1559880 dated May 31, 2016

\* cited by examiner

FRICTION ADJUSTMENT INTERFACE BETWEEN TWO PARTS MADE OF NICKEL OR NICKEL OR COBALT-CHROMIUM ALLOY THAT ARE IN RELATIVE MOTION AGAINST ONE ANOTHER AT HIGH TEMPERATURE

CROSS-REFERENCE TO RELATED APPLICATION

This application claims priority to French Patent Application No. 1559880 filed Oct. 16, 2015, the entire disclosure of which is incorporated by reference herein.

TECHNICAL FIELD

The present disclosure relates to an adjustment interface inserted between two parts made of nickel or made of nickel alloy or made of cobalt-chromium alloy that are in relative motion against one another. This interface makes it possible to reduce the surface wear of the two parts due to the friction between these parts. The present disclosure also relates to the process that makes it possible to obtain same.

BACKGROUND

The present disclosure relates more specifically to a high-temperature friction adjustment interface inserted between two parts made of nickel or made of nickel alloy or made of cobalt-chromium alloy that are in relative motion against one another. This interface makes it possible to reduce the surface wear of the two parts due to the friction between the two parts at high temperature, namely between the temperatures of 300° C. and 650° C. in an oxygen-containing atmosphere. This interface is particularly suitable for the parts used in applications that require particular tribological properties.

Nickel alloys such as for example Inconel 718 (registered trademark) have properties that are highly desired in the aeronautical industry, due to their mechanical strength at high temperature and their resistance to oxidation at high temperature.

However, nickel alloys have very poor friction behavior, associated with a marked tendency for galling, and a high sensitivity to the effect of scratching, and their use is particularly limited for applications that require particular tribological properties at high temperature.

In the aeronautical industry, the articulation joints that function at high temperature between the motor and pylon components are provided by an assembly constituted of ball joint, axle and rings. The parts constituting this system may be produced by nickel alloys such as Inconel 718.

This ball joint system generally comprises a concave part and a spherical part borne by an axle. The spherical part that is housed in the concave part is driven by a rotational movement in all directions; the surface of the spherical part and the surface of the concave part are in permanent friction against one another.

A distinction is mainly made, in the case of the ball joint system and in other similar systems, of two types of frictional wear, wear by very low amplitude friction which is generally of the order of a few micrometers to a few tenths of millimeters, also known as fretting wear or else vibratory frictional wear under load and additionally sliding wear, the amplitude of movement of which reaches several tens of millimeters. Frictional wear develops from fine asperities present on the rubbing surfaces in contact and that tend to stick together. When the load applied locally is high and in the case where the materials of the rubbing surfaces have similar compositions, the frictions give rise to surface wear and degradations that may range up to the galling of the axle or of the ball joint. These wear phenomena are even higher when these parts are made of nickel alloy. Furthermore, the high temperature of the environment (between 300° C. and 650° C.) favors the appearance of adhesive wear ultimately responsible for the galling cases.

It is therefore desirable to carry out a surface treatment of the parts made of nickel or nickel alloy or cobalt-chromium alloy for systems that are subject to continuous friction.

Commonly owned French patent application publication FR 2 907 468, filed 20 Oct. 2006, relates to a low-temperature adjustment interface. Described in this patent is a coating based on WC-C:H obtained by a physical vapor deposition (PVD) process combined with a copper alloy coating obtained by thermal spraying. This coating is satisfactory at a temperature below 250° C. On the other hand, these pairs of interface materials may prove less effective or even ineffective above a certain temperature since the copper is converted to copper monoxide and the WC-C:H graphitizes: therefore, the articulation wears rapidly and this type of interface leads to a rapid galling for very high temperatures between 400° C. and 650° C.

SUMMARY

Therefore, the subject matter herein discloses an adjustment interface between two friction surfaces made of nickel or nickel alloy or cobalt-chromium alloy, particularly suitable for parts of ball joint, axle, rings, etc. type, intended to easily and uniformly treat the parts made of nickel or nickel alloy or cobalt-chromium alloy irrespective of the geometry and the shape of the parts, and that makes it possible to significantly reduce adhesive frictional wear for high operating temperatures, namely between 300° C. and 650° C., by wisely using materials that are tribologically compatible while being suitable in terms of hardness with respect to the materials of the parts in order to improve and maintain the sliding properties and to enable dismantling by hand after operation.

In order to do this, the present disclosure proposes an adjustment interface inserted between a first part made of nickel or made of nickel alloy or made of cobalt-chromium alloy that is in relative motion with a second part made of nickel or made of nickel alloy or made of cobalt-chromium alloy, wherein the interface comprises two adjustment layers, a first adjustment layer is deposited on one of the two parts and has a composition that makes it possible, with the friction with the other part, to create a glaze-type layer;

a second adjustment layer is deposited on the second part for the purposes of cooperation with the first layer by making it possible to act as a catalyst for the oxide formed by friction with the first layer.

The first glaze layer of the interface improves the sliding of the parts under friction. The catalyst function provided by the second layer makes it possible to stabilize the oxide formed by friction and to thus ensure a lubrication function over an extended high-temperature range. In the field of materials, a "glaze" layer denotes, as is known, a protective oxide layer. This layer is formed when two metals are slid against one another at high temperature.

The interface may have at least one of the following optional features, taken in isolation or in combination.

The first adjustment layer is a layer of cobalt alloy, the cobalt content of which is at least 40%.

The first adjustment layer is an alloy of cobalt, chromium, molybdenum and silicon.

The cobalt content is 51%±1%, the molybdenum content is 28%±1%, the chromium content is 17%±1% and the silicon content is 4%±1% in the alloy of cobalt, chromium, molybdenum and silicon of the adjustment layer.

The first layer is pre-oxidized at a minimum temperature of 525° C. and a maximum temperature of 650° C. before being subjected to friction.

The first layer has a hardness lower than that of the first part, the first layer having a microporous morphology, giving the first layer a role of adapting the elasto-plastic properties via a porosity compaction mechanism.

The first layer has an overall density of micropores of between 2% and 30%.

The first layer has a thickness of between 50 μm and 200 μm after grinding.

The first layer has an elastic deformability of 80 GPa as Young's modulus.

The second adjustment layer is produced by thermochemical carbon diffusion treatment at the surface of the part.

The surface treated is made of Inconel 718.

The second adjustment layer has a surface hardness of greater than 850 HV.

The second adjustment layer has a diffusion depth (treatment thickness) of from 10 to 15 μm and a hardness of greater than 800 HV over the first 5 μm in the depth of the material.

The present disclosure also relates to the process for depositing the first adjustment layer on the part made of nickel or made of nickel alloy or cobalt-chromium alloy. The deposition process is a thermal spray coating deposition process comprising the following steps:

the surface of the part is subjected to a pretreatment in such a way that the adhesion between the part and the first adjustment layer withstands a tensile stress at least equal to 35 MPa; and the deposited layer is formed from a succession of passes of sprayings of metal particles in the molten state onto the surface of the part, the layer being a stack of lamellae, each lamella having a minimum thickness of 15 μm.

A grinding of the coating is carried out in order to obtain the final dimension.

A post-spraying oxidation is carried out at a temperature of 525° C. for 22 hours in an atmosphere composed of oxygen.

The first layer has a mean hardness of between 400 HV and 500 HV.

The present disclosure also relates to a process for depositing the second adjustment layer on the part made of nickel or made of nickel alloy or cobalt-chromium alloy. The deposition process comprises a process of thermochemical carbon diffusion treatment at the surface of the part.

The present disclosure also relates to an articulation device comprising the adjustment interface, the interface being inserted between a first part of small kinematic length and a second part of large kinematic length constituting the device, the first adjustment layer of the interface being applied to the small kinematic length and the second adjustment layer of the interface being applied to the large kinematic length.

BRIEF DESCRIPTION OF THE DRAWINGS

Other objectives, advantages and features of the disclosure herein will appear on reading the following description of the interface according to the disclosure herein, given by way of nonlimiting example with reference to the appended drawings, in which.

DETAILED DESCRIPTION

Figure 1:
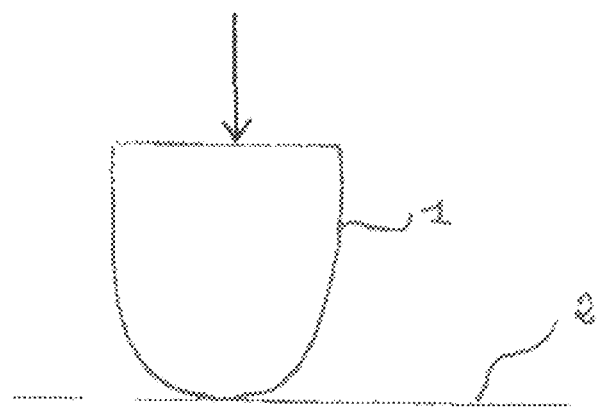
FIG. 1 schematically represents two parts in relative motion with respect to one another.

FIG. 1 schematically represents two parts 1, 2 in relative motion against one another. The amplitude of the movement may vary between several millimeters and several tens of millimeters. The kinematic configuration is similar to that of a mechanical system of ball joint type. Generally, a distinction is made between a first part having a small kinematic length 1 and a second part having a large kinematic length 2. The small kinematic length is defined by points always located in the contact surface and the large kinematic length by points periodically located in the contact surface.

For the remainder of the description, the part of small kinematic length 1 and the part of large kinematic length 2 are respectively named pin 1 and groove 2. The application load is applied in the direction of the pin toward the groove as represented in FIG. 1 by an arrow. The curvature of the contact surface of the pin 1 against the groove 2 varies as a function of the pressure of the load applied.

According to the disclosure herein, in order to increase the frictional resistance of these parts made of nickel or made of nickel alloy or made of cobalt-chromium alloy and to improve the sliding properties, a treatment interface is inserted between the two parts that are in relative motion against one another. This interface is advantageously a friction adjustment interface for the two parts.

Figure 2:
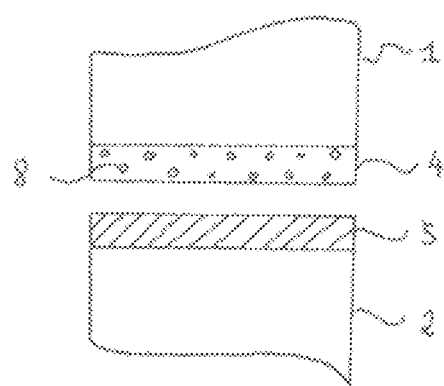
FIG. 2 schematically represents an embodiment of an adjustment interface inserted between two parts.

FIG. 2 schematically presents a first embodiment of the adjustment interface. The pin 1, the groove 2 and the adjustment interface inserted between the pin and the groove are modelled by a stack of layers.

The interface comprises two adjustment layers, of which a first adjustment layer 4 is deposited on the pin 1 and a second adjustment layer 5 that cooperates in terms of tribological properties with the first adjustment layer, is deposited on the groove 2.

Advantageously, as will be seen in the remainder of the description, the layer 4 and the layer 5 have complementary properties so as, on the one hand, to have an adjustment in terms of hardness between the pin 1 and the groove 2 and, on the other hand, an improvement in terms of sliding by exerting a lubricant function.

For this, the first adjustment layer 4 has a microporous morphology. The micropores 8 present within the layer 4 make it possible to trap the grease of a liquid lubricant. The release of this grease during the frictions between the pin 1 and the groove 2 enable the first layer 4 to exert a lubrication adjustment function.

Furthermore, the hardness of this first layer 4 is between that of the pin 1 and that of the second adjustment layer 5 in order to obtain a hardness gradient at the pin/first layer interface and at the first layer/second layer interface. This hardness gradient makes it possible to limit the frictional stresses and to consequently reduce the wear due to friction.

Figure 3:
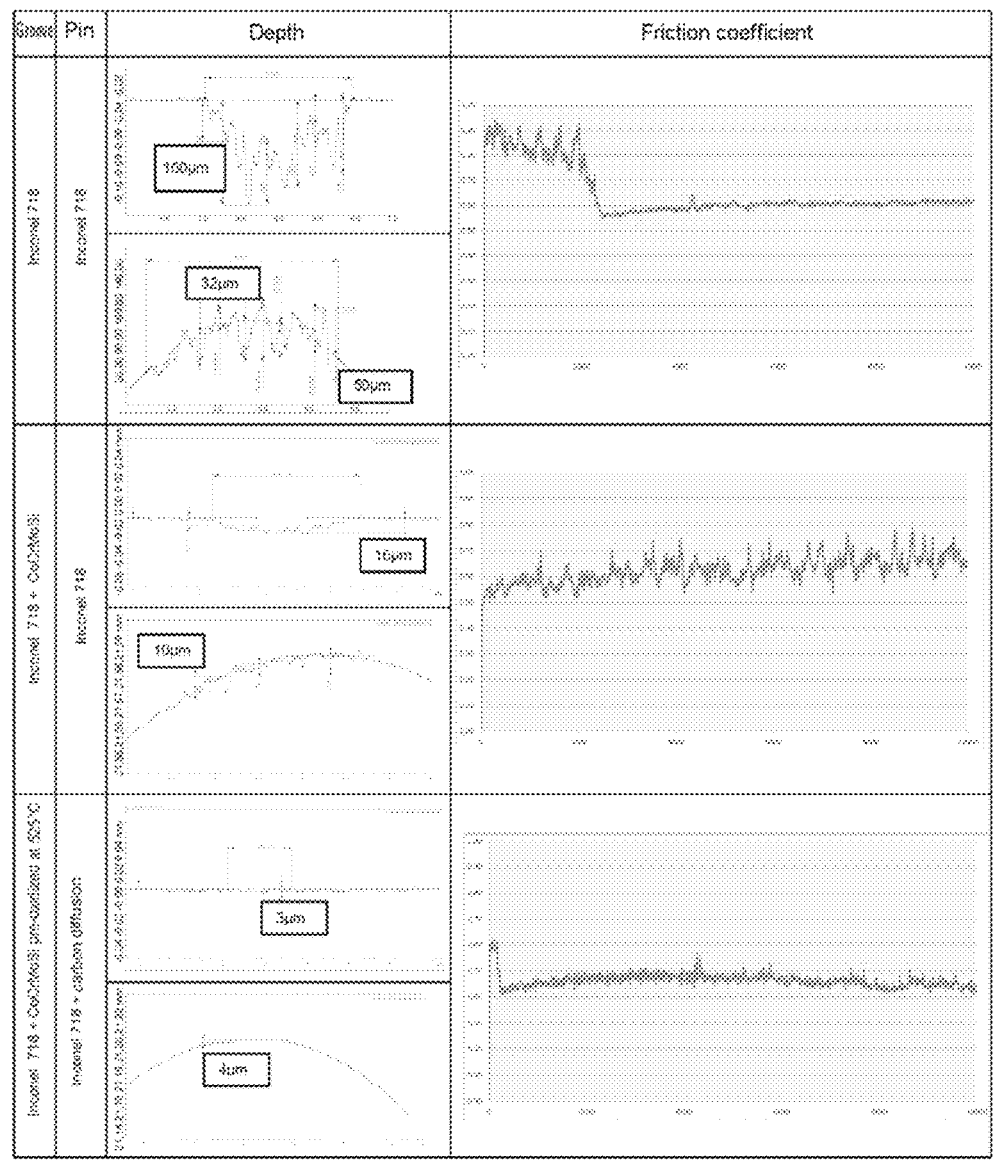
FIG. 3 represents curves of depth of wear and of friction coefficient as a function of time for various types of materials used for the interface.

For comparison purposes, FIG. 3 represents the characteristic curves for the behaviors of surfaces of two parts in friction against one another. The sliding wear tests are carried out with a linear reciprocating tribometer. The test conditions are the same for the three tests:
   contact pressure=250 MPa;
   amplitude of the movement=±3 mm;
   frequency=1 Hz;
   temperature=450° C.;
   number of cycles=10 000 cycles.

On the other hand, the materials of the adjustment layers of the interface differ from one test to the next and are respectively:
   Inconel 718 for both layers,
   Inconel 718 coated with CoCrMoSi for one layer and Inconel 718 for the other layer;
   Inconel 718 coated with CoCrMoSi and pre-oxidized at 525° C. for one layer and Inconel 718 that has undergone a carbon diffusion treatment for the other layer.

In FIG. 3, the first column specifies the material of the layer of the interface of the first part 1 in this case of the pin 1, the second column that of the second part 2, namely the groove 2. The third column represents the depth of the zones worn with time. The fourth column represents the change in the friction coefficient with the number of cycles run.

Figure 4:
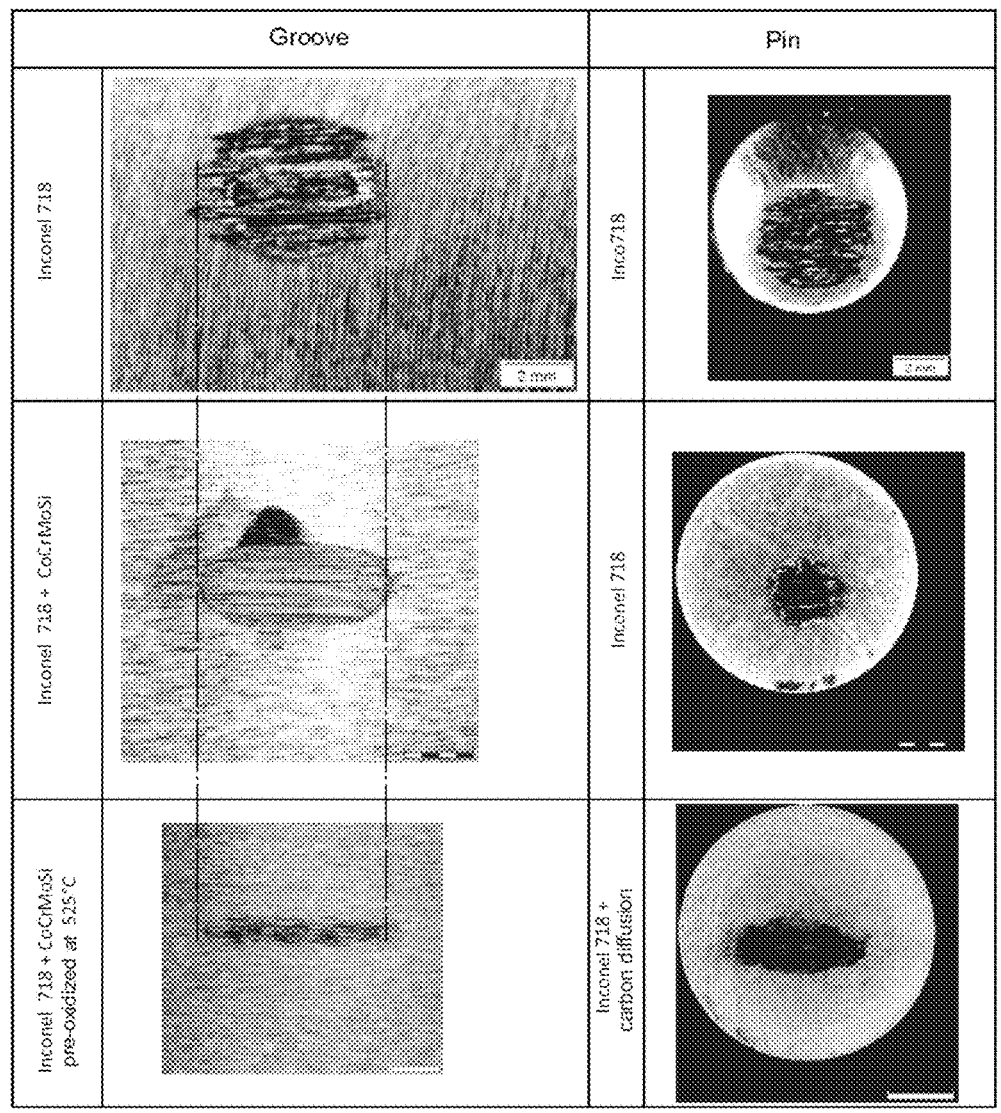
FIG. 4 is a series of photos showing the surface damage at the end of the wear test for various types of materials used for the interface.

FIG. 4 represents the result of these three tests by a photo of the respective surface of each of the two layers after the test.

In the case of two layers made of Inconel 718 which is the subject of the first test, a protective mixed nickel oxide layer, referred to as an oxide glaze layer or glaze layer in what follows, is formed under the action of the friction between 500° C. and 650° C. The oxide layer thus formed protects the materials against wear. However, the stabilization of this oxide may take one to two hours, during which time the interface is subjected to damage characteristic of galling: microwelds and deep scratches. This stabilization phase can be seen in the curves from FIG. 3. The friction coefficient is, during the phase preceding the stabilization phase, greater than 0.6. FIG. 4 shows the surface state and the depth of the scratches that are formed during this unstable phase. After a sufficiently prolonged friction time (greater than one hour) at temperature, the stable oxide is formed and makes it possible to obtain a stable friction coefficient at a value of around 0.6, the wear mechanism stops but the initial damage remains. Under friction conditions at a temperature of 450° C., galling is predominant and the interface no longer makes it possible to ensure normal sliding.

The two other tests represent results that are found to be improved with the aid of the interface described below.

The interface comprises two adjustment layers:
   a first adjustment layer 4 is deposited on one of the two parts, and for example the first part 1, and has a composition that makes it possible, with the friction with the other part, to create a glaze-type layer;
   a second adjustment layer 5 is deposited on the second part 2 for the purposes of cooperation with the first layer by making it possible to act as a catalyst for the oxide formed by friction with the first layer.

It could also be possible to deposit the layer 5 on the first part 1 and the layer 4 on the second part 2.

The latter function makes it possible to extend the stability of the oxide and to ensure the lubrication function over a broader high-temperature range from 300° C. to 650° C.

The first layer 4 deposited on the first part 1 has an increased resistance to oxidation at high temperature and makes it possible to obtain a stable glaze-type layer and a stable friction coefficient with no running-in period for a high temperature range, in particular from 300° C. to 650° C.

It has a hardness lower than that of the first part 1.

The second adjustment layer 5 cooperating with the first layer 4 and deposited on the second part 2 offers a hardness greater than that of the first layer 4. It has, according to one particular embodiment, a surface hardness of greater than 800 HV over the first five micrometers in the depth of the material. It has, in this case, a diffusion depth of 10 to 15 micrometers. According to one embodiment, the second adjustment layer has a surface hardness of greater than 850 HV.

The first layer 4 has an elasto-plastic deformability capable of reducing, within the interface, the contact pressures and the shear stresses generated by the friction between the two parts.

The first layer 4 having a microporous morphology, gives the first layer the role of adapting the elasto-plastic properties via a porosity compaction mechanism.

According to an embodiment, the first adjustment layer has an overall density of micropores of between 2% and 30%, which gives the interface a plastic deformability since the micropores are compacted under the effect of local stresses and homogenize the contact pressure field.

The adjustment layer may have a variable thickness. It proves optimal, from a size, weight and efficacy viewpoint when it is between 50 micrometers and 200 micrometers after grinding of the coating produced as will be seen below.

The first adjustment layer has a plastic deformability of 80 GPa (gigapascals) as Young's modulus. This property gives the interface a better elastic deformability.

According to an embodiment, the first adjustment layer is a layer of cobalt alloy, the cobalt content of which is at least 40%.

According to another embodiment, the first adjustment layer is an alloy of cobalt, molybdenum, chromium and silicon. According to one particular embodiment, the test results of which are represented in FIGS. 4 and 5, the cobalt content is 51%±1%, the molybdenum content is 28%±1%, the chromium content is 17%±1% and the silicon content is 4%±1%.

FIG. 3 shows that galling is avoided but that the friction coefficient μ is around 0.6. Furthermore, at the end of the test, this results in a wear of the CoCrMoSi coating over a depth of 16 μm that can be seen in FIG. 4. Thus, galling is avoided with this material pair (the mechanical bond will not be blocked) but the sliding conditions remain to be improved since the friction coefficient exceeds 0.5.

According to another embodiment, the first layer was subjected to a pre-oxidation at a temperature between 525° C. and 650° C. Still in the same embodiment, the second adjustment layer was subjected to a carbon atom diffusion obtained by thermochemical diffusion treatment such as case-hardening or nitrocarburizing. By way of illustration, the KOLSTERISING® (registered trademark of the company BODYCOTE) carburizing process allows a homogeneous diffusion of carbon at the surface of the nickel alloy. THERMI-SP® (registered trademark of the company Thermi-Lyon) produces a nitrocarburization and is equivalent to the previous process in order to obtain the targeted performance.

In this case, in addition to the absence of galling, as shown by FIG. 3, the friction coefficient is around 0.45, constant and low at a high temperature. This thus results in an optimal solution from the point of view of the wear (extremely limited as shown by FIG. 4) and the sliding function is provided with a satisfactory friction coefficient.

In certain embodiments, the first adjustment layer has a thickness of greater than 150 micrometers.

It is possible to provide a hard adjustment layer having a hardness coefficient greater than that of the second part which is inserted between the second part and the second adjustment layer, the layer being intended to introduce a hardness gradient between the second part and the corresponding second adjustment layer.

According to certain embodiments, the hard second adjustment layer has a thickness between 5 μm and 15 μm.

The processes that make it possible to obtain the adjustment layers 4 and 5 of the interface are described in what follows.

The first adjustment layer 4 is deposited by a thermal spraying process that enables a relatively thick deposit with a relatively high deposition rate. This deposition comprises the following steps:
  the surface of the substrate is subjected to a pretreatment in such a way that the adhesion between the substrate and the first adjustment layer withstands a tensile stress at least equal to 20 MPa,
  the layer is formed from a succession of passes of sprayings of metal particles in the molten state onto the surface of the substrate, the layer being a stack of lamellae, each lamella having a minimum thickness of 15 μm.

A grinding of the coating is carried out in order to obtain the final dimension.

The pretreatment is an operation that makes it possible to roughen the surface which allows a solid mechanical attachment. It may be, for example, a sandblasting pretreatment.

According to the embodiment in which the first layer is pre-oxidized, a post-spraying oxidation is carried out at a temperature of 525° C. for 22 hours in an atmosphere composed of oxygen (air).

The gradual change in density of micropores is obtained by varying the rate of deposition between two spraying passes.

The deposition conditions must make it possible to obtain a first adjustment layer 4 having a mean hardness of between 400 HV and 500 HV.

After the bending test, no crack should appear in the adjustment layer 4.

The second adjustment layer 5 is obtained by a process of thermochemical carbon diffusion treatment at the surface of the parts in order to form a hard and lubricating thin layer.

The interface proposed by the disclosure herein is particularly suitable for an articulation device that is constituted of two parts in relative motion one against the other, respectively corresponding to a nut and a concave portion in which the nut is housed. The concave portion corresponds to the groove having a large kinematic length and the nut to the pin having a small kinematic length. The first adjustment layer 4 of the interface is applied to the small kinematic length and the second adjustment layer 5 to the large kinematic length. As seen above, the reverse is also possible.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An adjustment interface inserted between a first part made of nickel, a nickel alloy or a cobalt-chromium alloy that is in relative motion with a second part made of nickel, a nickel alloy or a cobalt-chromium alloy, wherein the adjustment interface comprises two adjustment layers comprising:
  a first adjustment layer deposited on the first part of the two parts and having a composition that makes it possible, with the friction with the second part, to create a glaze-type layer;
  a second adjustment layer deposited on the second part for cooperation with the first adjustment layer by acting as a catalyst for an oxide formed by friction with the first adjustment layer.

2. The adjustment interface according to claim 1, wherein the first adjustment layer is an alloy of cobalt, chromium, molybdenum and silicon.

3. The adjustment interface as claimed in claim 1, wherein the first adjustment layer is pre-oxidized at a minimum temperature of 525° C. and a maximum temperature of 650° C. before being subjected to friction.

4. The adjustment interface according to claim 1, wherein the first adjustment layer has a hardness lower than that of the first part, the first adjustment layer having a microporous morphology, giving the first adjustment layer a role of adapting elasto-plastic properties via a porosity compaction mechanism.

5. The adjustment interface according to claim 1, wherein the first adjustment layer has an overall density of micropores of between 2% and 30%.

6. The adjustment interface according to claim 1, wherein the first adjustment layer has a thickness of between 50 μm and 200 μm after grinding.

7. The adjustment interface according to claim 1, wherein the first adjustment layer has an elastic deformability of 80 GPa as Young's modulus.

8. The adjustment interface according to claim 1, wherein the second adjustment layer is produced by thermochemical carbon diffusion treatment at a surface of the second part.

9. The adjustment interface according to claim 8, wherein the treated surface is made of nickel alloy 718.

10. The adjustment interface according to claim 9, wherein the second adjustment layer has a surface hardness of greater than 850 HV.

11. The adjustment interface according to claim 8, wherein the second adjustment layer has a surface hardness of greater than 850 HV.

12. The adjustment interface according to claim 8, wherein the second adjustment layer has a diffusion depth or treatment thickness of from 10 to 15 μm and a hardness of greater than 800 HV over the first 5 μm in the depth of the second adjustment layer.

13. A process for depositing the first adjustment layer on the first part made of nickel, a nickel alloy or a cobalt-chromium alloy according to claim 1, wherein the process is a thermal spray coating deposition process comprising:
  pretreating a surface of the first part to such that adhesion between the first part and the first adjustment layer withstands a tensile stress at least equal to 35 MPa;

forming the first adjustment layer from a succession of passes of sprayings of metal particles in a molten state onto the surface of the first part, the first adjustment layer being a stack of lamellae, each lamella having a minimum thickness of 15 µm.

14. The process according to claim 13, comprising grinding the coating to obtain a final thickness.

15. The process according to claim 13, comprising a post-spraying oxidation carried out at a temperature of 525° C. for 22 hours in an atmosphere of oxygen.

16. A process for depositing the second adjustment layer on the second part made of nickel, a nickel alloy or a cobalt-chromium alloy according to claim 1, wherein the process comprises a thermochemical carbon diffusion treatment at a surface of the second part.

17. An articulation device comprising the adjustment interface according to claim 1, the adjustment interface being inserted between the first part having a small kinematic length and the second part having a large kinematic length constituting the articulation device, the first adjustment layer of the adjustment interface applied to the small kinematic length and the second adjustment layer of the adjustment interface applied to the large kinematic length.

* * * * *